United States Patent

Sangster

[15] 3,691,372

[45] Sept. 12, 1972

[54] PHOTOELECTRIC TAPE READER HAVING READ HEAD DISPOSED ABOVE A LINE JOINING THE TOPMOST POINTS OF TWO DRIVE SPROCKETS

[72] Inventor: Arlon G. Sangster, Sterling, Mass.

[73] Assignee: Jamesburg Corp., Worcester, Mass.

[22] Filed: Feb. 11, 1971

[21] Appl. No.: 114,663

Related U.S. Application Data

[63] Continuation of Ser. No. 864,944, Sept. 25, 1969, which is a continuation-in-part of Ser. No. 693,778, Dec. 27, 1967.

[52] U.S. Cl. ..........................250/219 D, 235/61.11 E

[51] Int. Cl. ..........................G01n 21/30, G06k 7/00

[58] Field of Search ............250/219 D; 235/61.11 E; 346/136; 352/159; 226/78

[56] References Cited

UNITED STATES PATENTS

| | | | |
|---|---|---|---|
| 2,102,895 | 12/1937 | Hasbrouck | 226/78 X |
| 3,055,582 | 9/1962 | Battison | 235/61.11 E |
| 3,055,583 | 9/1962 | Demer | 235/61.11 E |
| 3,141,958 | 7/1964 | Stickel | 235/61.11 E |
| 3,387,117 | 6/1968 | Bungard | 235/61.11 E |
| 3,469,103 | 9/1969 | Erpel | 250/219 D |
| 3,502,187 | 3/1970 | Becking | 250/219 D |

OTHER PUBLICATIONS

Soholski, M.; " Fiber Optic Read Head," IBM Technical Disclosure Bulletin, Vol. 8, No. 6, Nov. 1965, pp. 879– 880.

*Primary Examiner*—James W. Lawrence
*Assistant Examiner*—T. N. Grigsby
*Attorney*—Arthur I. Neustadt

[57] ABSTRACT

Photo-optical tape reader comprising a pair of toothed tape feeding sprocket areas arranged in alignment on parallel closely spaced axes, spaced from each other only sufficiently to provide room for a photosensitive device between them, a lamp source, improved guiding and tension control of the tape leaving the side edges of the tape free and unencumbered, all of the guiding being done by the sprocket teeth; and including mechanical hold-down means for the tape relative to the sprocket areas by means of a pivoted cover allowing the tape to be manually loaded and unloaded, the cover confining the tape and insuring that it is in position to be correctly driven, said cover also shielding ambient light and protecting the photosensitive device from dirt and dust.

1 Claim, 7 Drawing Figures

Inventor
Arlon G. Sangster
By Charles R. Fay,
Attorney

PHOTOELECTRIC TAPE READER HAVING READ HEAD DISPOSED ABOVE A LINE JOINING THE TOPMOST POINTS OF TWO DRIVE SPROCKETS

This application is a continuation of my prior application Ser. No. 864,944 filed Sept. 25, 1969 which application is a continuation-in-part of my prior application Ser. No. 693,778 filed Dec. 27, 1967.

BACKGROUND OF THE INVENTION

Tape readers have long been in use but there are even to the present day many problems associated with these devices. Some tape readers especially the early ones utilized mechanical feelers to identify the holes in the tape but in more modern tape readers photo optical devices are used.

In the field of the present invention, even very slight changes in many cases produce a tremendous increase in usefulness, accuracy, speed of reading, and the longevity of the tape itself. In spite of the fact that prior art tape readers are commendably fast in operation, nevertheless the speed, efficiency and wear on the tape can be greatly improved. There is no such thing as perfect tape and even no such thing as a tape which is very close to perfect. This is particularly true when it is realized that each reading step is in the nature of 15° of a revolution which amounts to 0.100 of an inch, so that an extremely small error in the tape may result in inefficient operation of the readout device. Since the tapes are sprocket driven, they wear out very quickly, due to the imperfections thereof as to hole and sprocket tooth alignment; there is a great deal of leakage of lighting with the bar of light now in use, causing inaccurate reading of the tape, i.e., "cross talk." The bar of light can leak laterally relative to the respective photocells.

Furthermore, ambient light restricts the use of prior art readout devices in good light; they have to be used in dim light or darkness.

SUMMARY OF THE INVENTION

The present invention provides solutions to the problems enumerated above. By placing the sprockets close together, the inaccuracies in the holes in the tapes do not affect the readings nor do they become magnified as with sprockets which are widely spaced, and tapes used in the present apparatus can be used indefinitely, i.e., a million times.

Furthermore, the side edges of the tape are left free and unencumbered in the present invention, all of the guiding being done by the sprocket teeth, and again this is only possible due to the construction herein wherein the sprockets are closely spaced together.

This invention also includes new and improved mechanical holddown means for the tape relative to the sprocket areas by means of a closely fitted pivoted cover allowing the tape to be manually loaded and unloaded, the cover providing guide means confining the tape and insuring its correct position. This cover is also made in such a way that it shields against ambient light and protects the photosensitive device from dirt and dust, by complementary cover and sprocket base parts.

The photosensitive device in this case comprise a series of light pipes, one pipe for each hole or hole location in the tape, and this does away with the prior art inefficient light bar.

This invention also provides a new and improved construction which is relatively simple and inexpensive, but includes positive driving by means of the sprockets capable of running at very high speeds and varying speeds, maintaining the tape in a positive guided position by means of the teeth on the sprockets driving the tape in a well guided positive manner past the lamps and the cooperating photosensitive devices for reading the tape, and any kind of side guiding at the edges is completely avoided.

PREFERRED EMBODIMENT OF THE INVENTION

Figure 1:
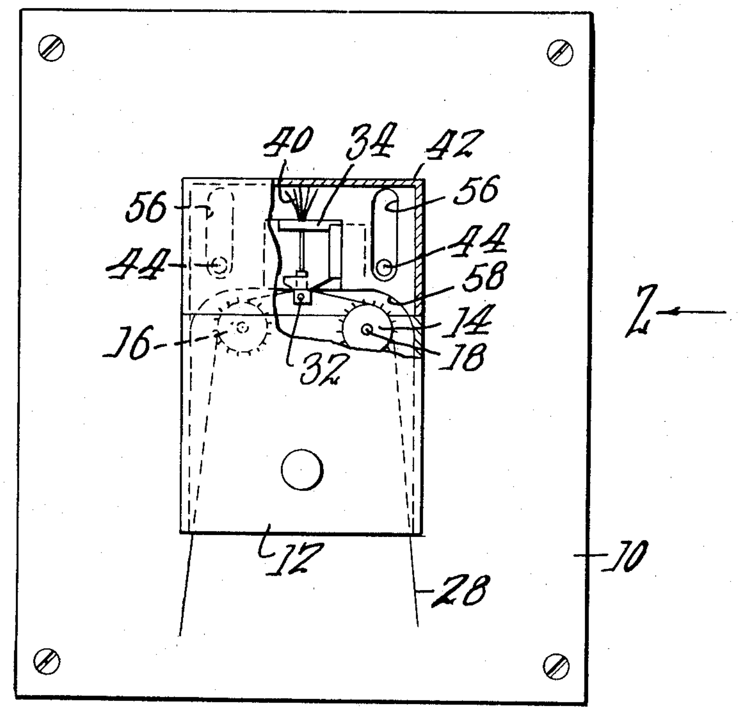
FIG. 1 is a view in front elevation of the new reader, parts being broken away.

The reader of the present invention may be mounted on a plate 10 for mounting on a panel and comprises a lower casing 12 which is broken away in FIG. 1 showing the position of one of the sprockets 14, the other sprocket being shown in dotted lines at 16. These sprockets are mounted on parallel shafts, one of which is indicated at 18, mounted in the casing 12 and driven as for instance by pulleys 20. The parallel shafts are closely disposed so as to realize a tape path from one sprocket to the other substantially equal to 1.4 inches. Pulleys 20 are driven by timing belt 22 from the timing pulley 24 driven by a step motor 26.

This step motor operates to index one portion of a revolution when driven by appropriate electrical circuitry. As an example, the particular motor employed may make thirty-two steps per revolution and during each step, even at high rates of speed, starts, accelerates, decelerates, and stops. The number of teeth in the timing belt drive are such that one step of the motor advances the tape which is indicated at 28 one step.

The tape may be a well known perforated tape and it is provided with holes located generally centrally thereof at a spacing substantially equal to 0.1 inches for engagement with the points 30 on the driving sprockets 14 and 16, the tape passing over the remainder of the pulleys and engaging the sprocket, being held down by means to be described. The free edges of the tape however are completely free and unguided and do not require any kind of side or edge guiding members because of the fact that the two driving sprockets 14 and 16 drive the belt under a controlled tension.

The number of teeth in the timing belt drive 22 are such that one step of the motor advances the tape one driving hole in the tape. A lateral row of holes or a tape code is defined as a single character. Each step of the motor transports the tape in such a manner as to pass one character per step as between a light source 32 and the reading head which is indicated generally at 34.

Figures 3, 4, 5, 6, 7:
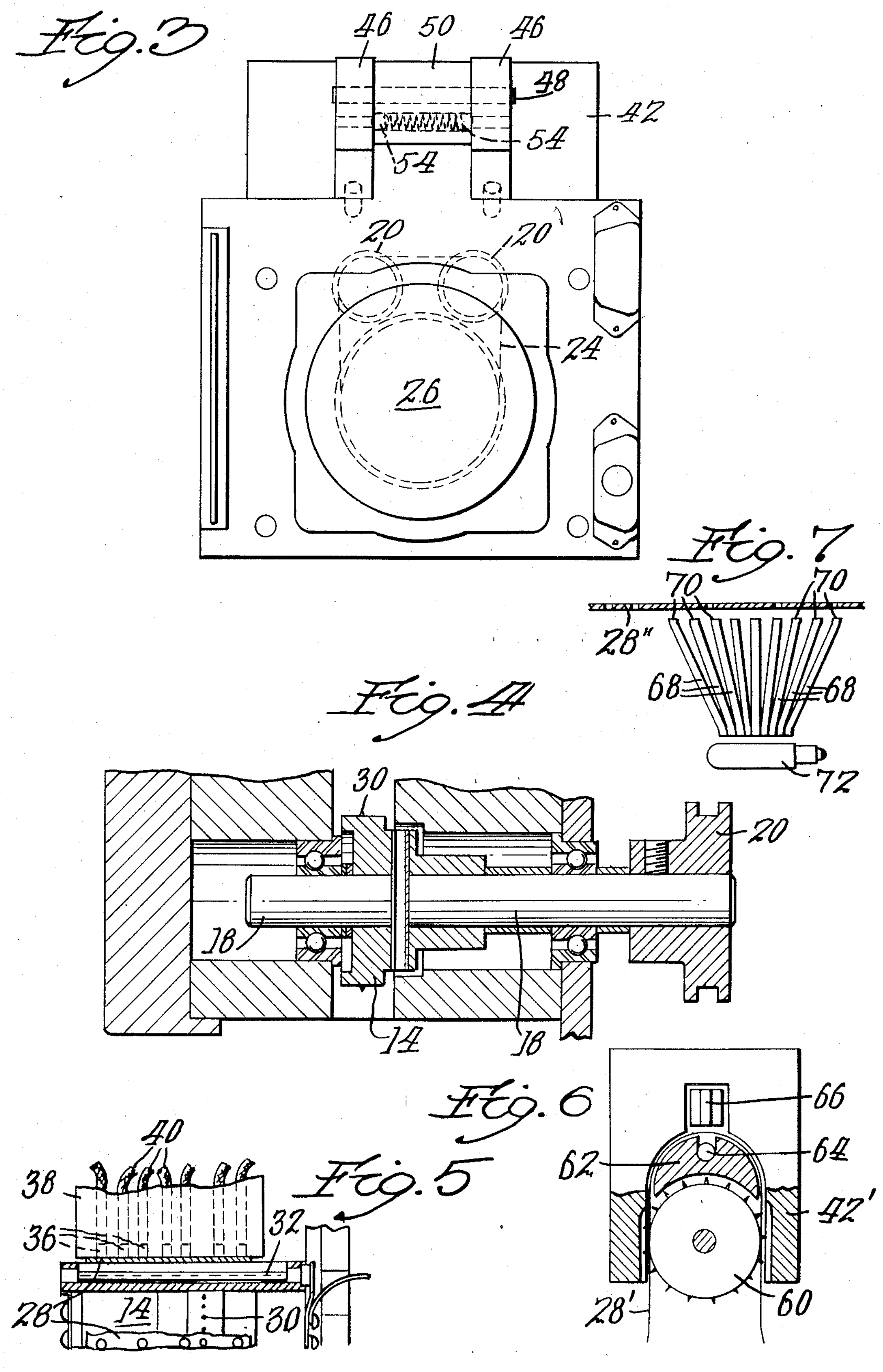
FIG. 3 is a sectional view illustrating parts of the hinged cover.
FIG. 4 is a partial view on an enlarged scale of one of the sprockets and its driving means.
FIG. 5 is a detailed elevation of the light source.
FIG. 6 is a partial view showing a modification.
FIG. 7 is a detail view showing a means of providing a series of light sources.

The reading head at 34 contains a series of separate photosensitive devices, each one of which is wired as may be required and which extend transversely with respect to the tape and parallel to the light source 32 as seen in FIG. 5. The photosensitive devices are indicated as for instance at 36, being mounted on a head 38 and having connections 40 as will be clear to those skilled in the art.

The light source 32 is shown in FIG. 5 as comprising a single line continuous lamp. These lamps are provided with a single line filament and give off an equal amount of light anywhere along the length thereof.

However, the invention is not limited to such line filament light because each of the photosensitive devices 36 could very well have its own individual lamp so that there would be a row of individual lamps along the length of the light source 32 rather than a single line filament shown.

In any event, the light emanating from the source 32 passes through any holes which may be present in a particular tape character and falls on the face of the photosensitive device mounted in the reading head 34. Each of the rows of possible holes in the tape is in line with the photosensitive device so that if a hole appears in the tape, light is allowed to fall on the face of the photosensitive device and produces an electric signal thereby.

The tape is mechanically held in contact with the driving sprockets by the cover 42 which is pivoted on a rod 48, see FIG. 3, between open and closed position, the same being shown closed in FIG. 1.

Figure 2:
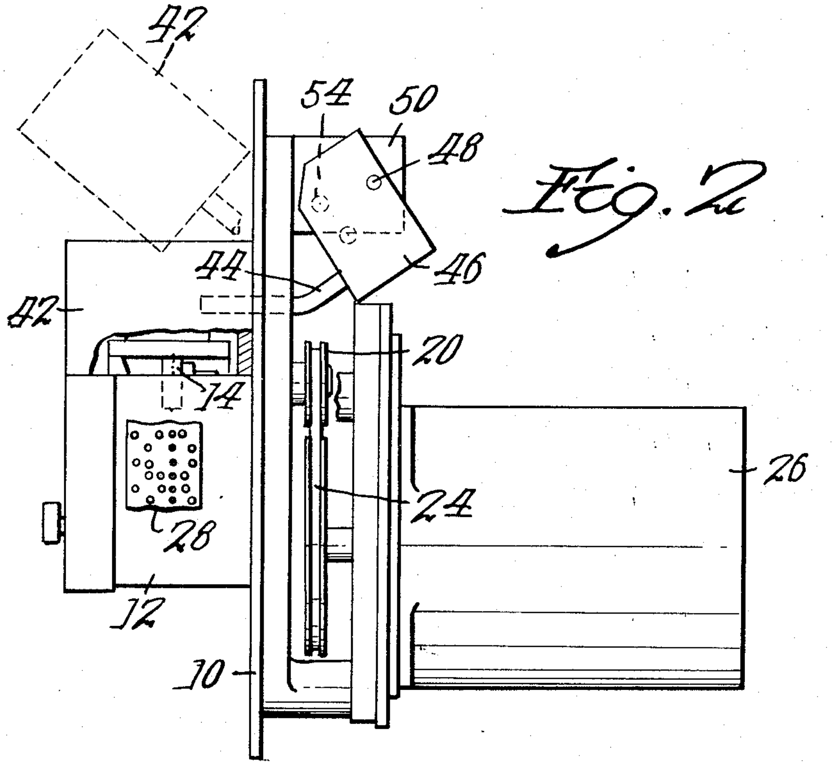
FIG. 2 is a view in side elevation thereof looking in the direction of arrow 2 in FIG. 1.

Cover 42 is mounted on a pair of rods 44 which extend through mounting plate 10 to the rear. These rods as seen in FIG. 2 are bent and each one is connected to a separate plate 46. These plates are affixed to and mounted on a pivot rod 48 mounted in fixed relation on a plate or plates 50. Mounted in a block 50 between plates 46, 46 are a pair of spring-pressed detents 54, 54 and these are used to hold the total assembly of cover 42, rods 44 and plates 46 in either the down position shown in solid lines in FIG. 2 or the up position which is shown in dotted lines, and therefore the cover 42 can be manually raised to open position where it stays or can be depressed to closed position where it also stays without vibration. There are a pair of slots at 56, 56 in plate 10 to accommodate the motion of rods 44.

The cover is provided with slots 58 to accommodate and overlay the driving sprockets and the tape. However the cover fits closely about its edges to the block 12 which mounts the sprockets completely covering the lamp and sprockets as well as the tape in the operative area to keep out all ambient light, dust and dirt.

FIG. 6 shows a single sprocket construction which can be used instead of two sprockets while still retaining the benefit of obviating the need for side guides. The perforated tape 28′ passes under the cover 42′ driven by the teeth of single sprocket 60 at the right-hand side thereof, and also by the same teeth at the left-hand side. This maintains the relationship of the two sprockets 14 and 16 and a guide 62 forms a loop in the tape and a mount for the light at 64, the cells being shown at 66.

FIG. 7 shows a means of obtaining a series of very small lights by using light pipes 68, e.g. fibers, spread to the desired degree to emit separate beams at 70, 70, while still using a single source 72, the tape 28″ having the perforations to match the separate lights at 70.

I claim:

1. A photo-optical multichannel perforated tape reader comprising a first drive shaft, a first tape drive sprocket rigidly mounted to said first drive shaft, a second drive shaft parallelly disposed with respect to said first drive shaft, a second tape drive sprocket rigidly mounted to said second drive shaft, said first and said second tape drive sprockets being adapted to receive a multichannel perforated tape having a sprocket channel with evenly spaced openings therein, each of said first and said second tape drive sprockets having a plurality of teeth about its periphery with the distance between adjacent teeth at the periphery of the sprocket being substantially equal to 0.1 inches in order to mesh with the sprocket channel on the tape wherein the sprocket openings are spaced substantially 0.1 inches from each other, light source means disposed on one side of the multichannel perforated tape to pass light through the perforations on the portion of the tape directly opposite to said light source means, a plurality of read means oppositely disposed to said light source means on the other side of the perforated multichannel tape to detect the presence or absence of light from said light source means passing through the perforations in the tape, the opening between said light source means and said plurality of read means through which is passed the multichannel perforated tape being disposed above a line joining the topmost point of said first tape drive sprocket with the topmost point of said second tape drive sprocket causing the tape path between said first and said second tape drive sprockets to have a turning point as it passes between said light source means and said plurality of read means, the tape being wrapped about at least 20 percent of the periphery of said first tape drive sprocket and being further wrapped about at least 20 percent of the periphery of said second tape drive sprocket to ensure proper tape registration and eliminate the need for hold-down means in the vicinity of said first tape drive sprocket and in the vicinity of said second tape drive sprocket, rotary motor means, means connecting said rotary motor means to said first and said second drive shafts to simultaneously rotate said first and said second tape drive sprockets, said first and said second tape drive sprockets being parallelly disposed with a separation such that the tape path between said first and said second tape drive sprockets is substantially equal to 1.4 inches so that simultaneous rotation of said first and said second tape drive sprockets maintains the portion of the multichannel perforated tape between said first and said second tape drive sprockets in a taut position to minimize errors of tape registration and to minimize errors caused by tape irregularities.

* * * * *

UNITED STATES PATENT AND TRADEMARK OFFICE

CERTIFICATE OF CORRECTION

PATENT NO. : 3,691,372

DATED : Sept. 12, 1972

INVENTOR(S) : Sangster

It is certified that error appears in the above-identified patent and that said Letters Patent are hereby corrected as shown below:

Correct the name of the Assignee from "Jamesburg Corp." to --Jamesbury Corp--.

Signed and Sealed this

*Twentieth* Day of *July 1982*

[SEAL]

*Attest:*

GERALD J. MOSSINGHOFF

*Attesting Officer* *Commissioner of Patents and Trademarks*